United States Patent [19]
Harold

[11] 3,820,817
[45] June 28, 1974

[54] ADJUSTABLE TIE DOWN SYSTEM

[76] Inventor: Billy E. Harold, 6869 Oldham, Taylor, Mich. 48180

[22] Filed: Aug. 27, 1973

[21] Appl. No.: 391,939

[52] U.S. Cl. ...... 280/179 A, 105/368 T, 248/361 A
[51] Int. Cl. ............................................. B60p 7/00
[58] Field of Search .................. 280/179 A, 179 R; 105/368 T, 369 A; 248/361 A; 292/60, 266, 278

[56] References Cited
UNITED STATES PATENTS

| | | | |
|---|---|---|---|
| 1,770,798 | 7/1930 | Nicholson | 105/368 T |
| 2,032,591 | 3/1936 | Pride | 280/179 A |
| 2,205,273 | 6/1940 | Radey | 105/368 T |
| 3,187,686 | 6/1965 | Podesta | 280/179 R X |

Primary Examiner—M. Henson Wood, Jr.
Assistant Examiner—John J. Love

[57] ABSTRACT

A tie down system for securing a vehicle such as an automobile to a carrier for transport. The vehicle body is attached at four locations by adjustable chain means in which the chain attachment members are simply and adjustably movable one link at a time to make provision for attachment of different length, height and width vehicles without requiring extensive adjustment to adapt to the different sizes. An intermediate collar is employed to adjust the position and thus the angle of the attachment chain with respect to the substantially horizontal track on which the vehicle is mounted on the carrier.

15 Claims, 9 Drawing Figures

ADJUSTABLE TIE DOWN SYSTEM

BACKGROUND OF THE INVENTION

This invention relates to tie down systems which are used for tying down a transported vehicle on a carrier vehicle and is of particular advantage when employed in tying down automotive vehicles, such as passenger vehicles, pickup trucks, and the like, on truck hauled carriers or on specialized railroad cars.

In automotive vehicles, the body is supported from the wheels by springs and it has been found advisable to tie down the body of the automobile to the carrier to prevent excessive springing action between the body and the wheels of the automobile when the carrier is subjected to shocks, such as occur on bumpy roads or at high speed travel. It is important that excessive springing be restrained to avoid damage to springs and shock absorbers in particular.

In conventional practice, the automobiles are tied down by a number of chains fixed to four locations of each auto frame and to a like number of chain carriages that are disposed in tracks extending longitudinally of the auto body under the wheels. The chain carriages must be adjustably located and locked in place on the track. Winches, pawls and the like are generally included to complete the attachment. In order to provide some longitudinal stability for the automobile, it is desirable that the attachment strips or chains extend at angles of about 45° each in the longitudinal direction of the automobile, with the chains at the front of the automobile being inclined towards its front and those at the rear of the automobile inclined in the opposite direction. In an alternate arrangement, the chains attached at the front portion of the automobile might be inclined rearwardly, while the rearward chains would be inclined in a like 45° angle but in the opposite direction. Thus, the chains are arranged in such angular relationship that only two, either the two at the front or the two at the rear, are under stress in the event of longitudinal shock.

Because of the great differences in size of the cars manufactured, it is necessary that the attaching system be freely adjustable between wide limits to accommodate, for example, on a single vehicle carrier, four or five different wheel base lengths or different width vehicles. A number of rlatively complicated systems are known in the prior art to achieve the above objectives and examples of these are found in U.S. Pat. No. 2,205,273 in which the tie down system requires a complicated arrangement of preformed slots formed in the carrier bottom to provide adjustable sliding therealong of the locking members. The disadvantages of this type arrangement are considerable because of the likelihood of ice and snow freezing and accumulating in such tracks and impeding the use of the adjustable locking and sliding arrangement.

U.S. Pat. No. 3,595,598 discloses a different arrangement for vehicle transport and tie down but requires a rather complicated arrangement of winches and cables which is considerably more difficult to use and connect than the apparatus of the present invention.

U.S. Pat. No. 2,047,503 shows a still further tie down system but again requires slots being formed in the surface of the carrier track and is subject to the same disadvantages with respect to ice and snow as discussed with respect to U.S. Pat. No. 3,595,598.

The present invention offers striking advantages as compared to the prior art systems since it requires a minimum number of parts, yet offers an extremely broad adjustment capability both with respect to width and length as compared to the prior art devices. The several parts of the tie down system comprise standard link chain, with specialized hooks and collars, all of which are capable of easy fabrication and joining together in operation. The tie down system of my invention is readily adaptable for use in existing carrier equipment.

BRIEF DESCRIPTION OF THE DRAWINGS

The following specification will now be used to explain the structure and clarify the operation of the present invention and to show the details of various embodiments of the invention in the drawings, in which.

DETAILED DESCRIPTION OF THE SEVERAL EMBODIMENTS

Figure 1:
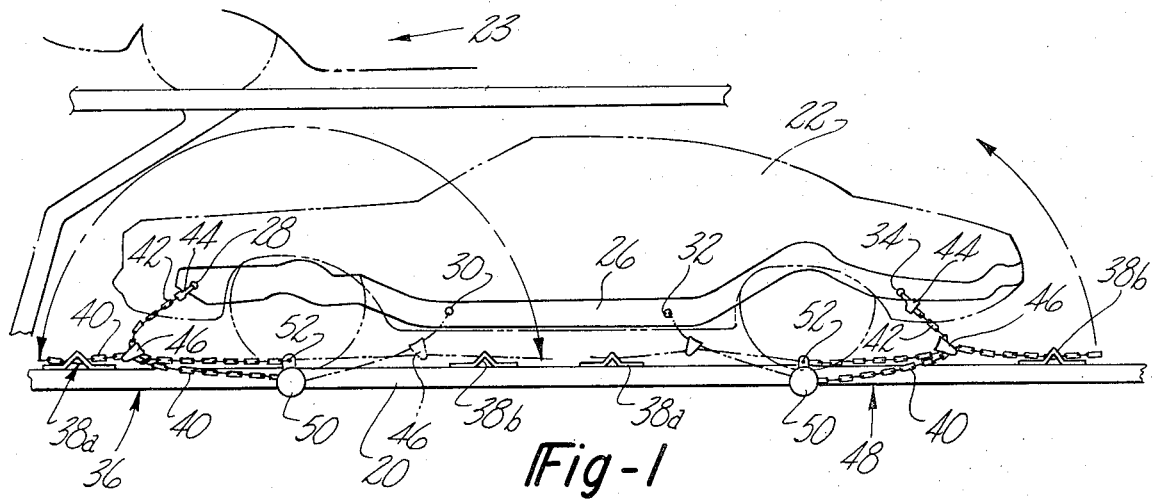
FIG. 1 is a fragmentary elevational view showing an automotive vehicle supported and restrained on a carrier.

With reference to FIG. 1, there is shown a track 20 which is fixed to the carrier for the carried vehicle, such as an automobile 22. Different types of double and triple level carriers are well known as being used in both railroad car carriers and in truck drawn carriers for automobiles. The automobile 22 is supported on a lower level while additional automobiles, such as the one designated 23, are supported on an upper track level. The present invention relates to a tie down arrangement for automobiles which is capable of an almost infinite number of adjustments to accommodate different sized automobiles. It will be understood that in accordance with ordinary automobile design and manufacture there are provided a plurality of attachment openings in each automobile frame 26, such as forward openings 28, 30 and rearward openings 32, 34. Depending on the length of the vehicle and the corresponding length of its frame, these openings may be further apart or closer together. It is necessary that each carrier vehicle accommodate a great variety of sizes since the shipments to individual or regional groups of dealers may include a number of different types of vehicles on a single carrier.

The chain tie down system for the front of the automobile 22 is indicated generally by the numeral 36. Included in the system 36 is a pair of spaced chain holders 38a and 38b, which are adapted to retain in place a chain 40. A second chain 42 is employed in the system which carries at its upper end a hook 44 which is engageable with the opening 28 formed in the frame 26 of the automobile.

It will be understood that, while the present invention is being described as being related to automobiles as the carried item, it is possible to extend the system in its use to tractors, vans, trucks, and a great variety of similar wheeled vehicles which are transported in this manner.

The system further includes an adjustable collar 46 which is movable link by link along the chain 40 so that in accordance with the length of the automobile 22 the position of the collar 46 and hence the angle as between the chain 42 and the horizontal may be adjusted, with the optimum arrangement being considered substantially of the magnitude of 45° from the horizontal.

A second rearwardly located tie down system is indicated generally by the numeral 48 and in a like manner to the forward tie down system 36 includes a pair of chain holders attached to the upper surface of the track 20, such as chain holders 38a and hooks 38b. Included further in the system in a like manner to the forward tie down system 36 are a pair of chains 40, 42, with the upper hook 44 engaging the opening 34 in the frame 26. The collar 46 again is incrementally movable link-by-link along the length of the chain 40 to provide adjustment of the angle with which the chain 42 is held relative to the horizontal.

In the system of FIG. 1, it will be seen that there are several optional locking positions available, for example, the one illustrated in solid line designation in which the forward system 36 with its associated chain 42 has its hook 44 fitted in the left hand or frontward opening 28, and in which the rearward system 48 has chain 42 and hook 44 connected to the right hand or rearward opening 34. By reason of the central pivotal mounting on a pin or bolt 54, the chain 40 can be swung, as indicated by the arrows, through a 180° turn into locking engagement with the associated chain holder 38b to permit the attachment, as it is illustrated in phantom line, through the opening 30 in the frame 26. In a like manner with respect to the rearward tie down system 48, its associated chain 40 may be detached and swung forwardly through a 180° path so that the chain 40 in that case would be locked in holder 38a, while the chain 42 has its associated hook 44 connected in the opening 32 of the frame 26. In this case, the chains of the tie down system again apply opposed roughly 45° inclined forces against displacement of the vehicle. The detail of the mountings 50 and the associated parts are clarified further in connection with FIGS. 2 and 5 hereinafter.

Figure 2:
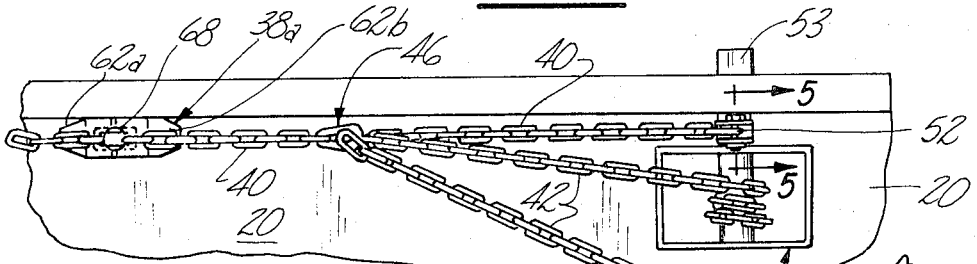
FIG. 2 is a top plan view of a portion of the system shown in FIG. 1 to enlarged scale and with parts broken away.
Figure 5:
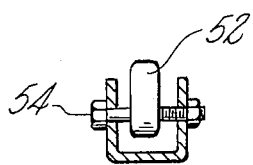
FIG. 5 is a partial sectional view taken along the lines 5—5 of FIG. 2.

FIG. 2 and FIG. 5 are views showing the manner in which the track 20 has attached to its upper surface the forward chain holder 38a. As shown in the drawings, there are several additional links of the chain 40 to the left of the holder 38a to allow for its selective adjustment rightwardly as the length of the car requires such positioning to maintain the 45° angle attachment of the chain 42. The adjustable collar 46 is shown with the chain 42 passing through it while the collar at the same time is movable along the separate links of the lower chain 40. Shown at the right hand side of the drawing is the mounting means 50 for chain 42. The chain 42 is looped around a pipe tie down shaft 53 mounted below the track 20. A T-hook 44 is connected to the end link of the chain 42 and adapted to be inserted into holding engagement with its forward lateral extension 45 through an opening such as the opening 28 in the frame 26. The chain 40 has its right hand end attached to an upstanding lug 52 fixed to a pivot pin 54. It will be understood that the pivotal mounting arrangement just described may be replaced, for example, by the mounting of the lower chain 40 between a pair of spaced holders 38a and 38b.

Figure 3:
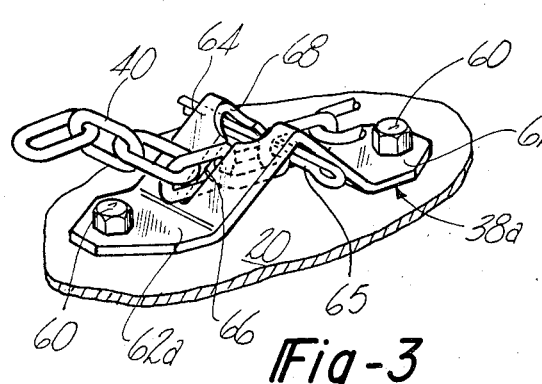
FIG. 3 is a perspective view of one type of chain holder used in the system of FIG. 1.

FIG. 3 is included to clarify the structural details of one of the chain holders, such as the holder 38a. The holder 38a is fixed on the upper surface of the track 20 by a pair of bolts 60. Included in the chain holder 38a are a pair of flat portions 62a and 62b which are held in flat registry with the upper surface of the track 20. There is a central raised or bend portion 64 through which the chain 40 links are passed and at selected link positions held in a locked position. This locking is provided through an elongated opening or slot 66 provided in the sides of the bend portion 64 and an enlarged circular opening 68 provided near the upper part of the bend portion 64. The opening 68 is of a size sufficient to pass down within the bend portion 64 one of the links of the chain 40. In this manner, the link of the chain 40 which is retained within the bend portion 64 is locked against longitudinal displacement in the holder 38. A hairpin-type fastener 65 may included.

Figure 4:
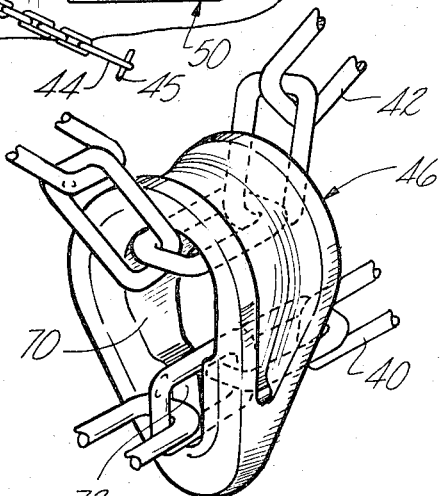
FIG. 4 is a perspective view showing the detail of one type of adjustment collar used in the tie down system.

FIG. 4 is a showing of the collar 46 drawn to enlarged scale. For adjustment, the collar 46 has an upper enlarged opening 70 which communicates with a lower relatively narrow slot 72. The upper enlarged opening 70 has a through length longer than the length of one of the links of the upper chain 42 so that the chain 42 is passed through it and permitted to have sliding movement through the opening 70. On the other hand, the lower chain 40 is adapted and sized relative to the lower slot 72 of the collar 46 so that the vertically oriented link of the chain 40 is retained within the slot 72 but the adjoining horizontally oriented links of the chain 40 cannot pass through the slot 72. Thus, the adjustment of the collar 46 longitudinally with respect to the links of the lower chain 40 is accomplished simply by lifting the lower chain 40 and sliding the collar 46 link by link through the opening 70. At the point desired, the aligned vertically disposed link of the chain 40 is dropped into the slot 72 to retain the collar 46 and the upper chain 42 against displacement.

Figure 6:
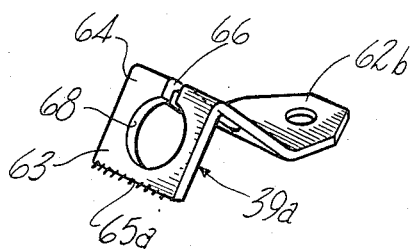
FIG. 6 is a perspective view showing a different embodiment of a chain hook used in the present invention.

FIG. 6 shows a somewhat different embodiment of a chain holder, such as a holder 39a, which is adapted to hold in place the lower of the two chains, namely chain 40. In a like manner to the device of FIG. 3, the enlarged, substantially circular opening 68 and a narrower slot or opening 66 are included to allow retention of individual links of the chain 40 in locked engagement in the holder 38a. The mounting in the track 20 is provided by a flat portion 62b formed in one end of the chain holder 39a and an opposite end portion 63. The end portion 63 is adapted to be secured, for example, by a weldment 65a to the upper surface of the track 20. The system of FIG. 6, in a like manner to that of FIG. 3, allows incremental link-by-link adjustment of the collar 46 along the chain 40 so that the proper angle as between the upper chain 42 and the horizontal can be achieved for each different car length. The chain holder 38a or 39a further permits shortening or lengthening of the length of the chain 40 to facilitate lateral or vertical adjustment of the attachment hook 44 as may be required to fit the dimensions of the vehicle being transported.

Figure 7:
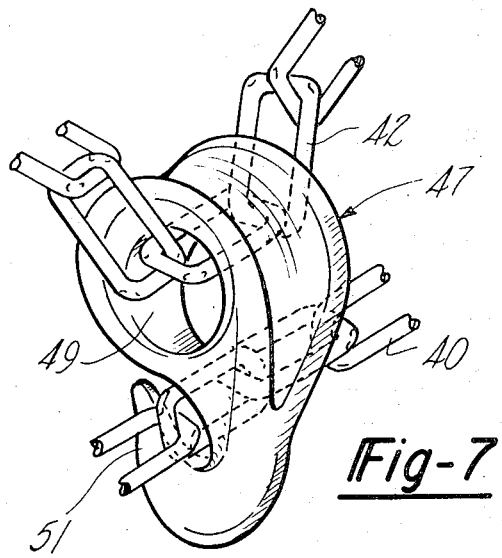
FIG. 7 is a perspective view showing the detail of an alternate embodiment of the collar which is employed in the tie down system.

FIG. 7 shows an alternate embodiment of the adjustment collar of FIG. 4. It will be seen that the collar 47 includes an upper passage 49 formed therethrough to pass and retain individual links of the chain 42. A lower hooked projection 51 is formed integrally with the collar 47 to provide attachment of the collar 47 to a selected one of the links of the lower chain 40. Thus the collar 47 may be moved link-by-link along the length of the chain 40 to accommodate vehicles of different length.

Figure 8:
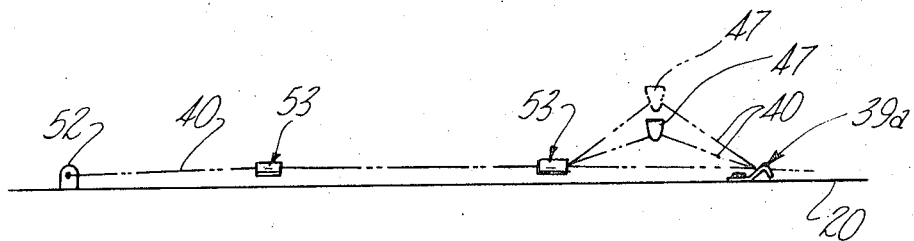
FIG. 8 is a diagrammatic showing of a portion of the system used in conjunction with the embodiment of collar shown in FIG. 7.
Figure 9:
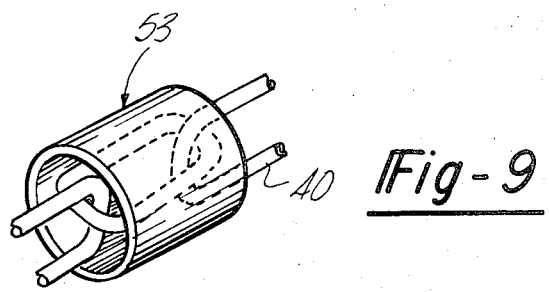
FIG. 9 is an enlarged perspective view of a part of the apparatus of FIG. 7.

FIGS. 8 and 9 show the manner in which a chain 40 used with the collar 47 of FIG. 7 is connected to the track 20. The chain 40 is attached between a lug 52 and a chain holder 39a. A pair of pipes 53 are included, each welded or otherwise fastened to the upper surface of the track 20. Each pipe 53 is appropriately dimensioned to permit the links of the chain 40 to slide through it. As illustrated in FIG. 8, the chain holder 39a is used to permit adjustment of the chain 40 between upper and lower positions shown in phantom by way of example. In this manner, the associated attachment hook can be adjusted to provide for differences both in height and in width of the different vehicles being transported.

It will be seen that I have provided by my invention a novel and substantially improved tie down system for automotive vehicles and the like. It will be understood that those skilled in the art will make minor changes in the embodiments shown without departing from the spirit of the invention.

I claim:

1. A system for securing to the track of a carrier a carried vehicle including attachment openings formed in its frame, said system comprising:
   a first chain connected intermediate a pair of chain holders mounted on said carrier track;
   a collar movable link by link along the length of said first chain; and
   a second chain having one end fixed to the vehicle track of the carrier, extending through said collar and having at its other end a hook, said hook engageable with said attachment opening.

2. The combination as set forth in claim 1 wherein said means for connecting said first chain to said track comprises a pair of chain holders, each including a raised center portion and a base portion fixed to the track of said carrier, said raised center portion having a longitudinal slot and a substantially enlarged opening communicating therewith to provide the adjustment incrementally link by link of the chain holder along said first chain.

3. The combination as set forth in claim 2 wherein a pin is included for securing the links of said first chain in said raised center portion of said holder.

4. The combination as set forth in claim 1 wherein one of said chain holders comprises a pin for mounting said first chain for arcuate movement through substantially a half-circle into engagement with a different spaced chain holder to permit selective attachment of the second chain hook to a selected one of a plurality of different frame openings provided in the vehicle.

5. The combination as set forth in claim 4 wherein said other chain holder has a flat portion and a raised portion, a fastener is included for anchoring said flat portion to said track, and the forward edge of said raised portion is connected by welding to the track.

6. The combination as set forth in claim 5 wherein said raised portion comprises a substantially 90° bend including substantially circular opening on one bend face and a longitudinally elongated slot in the other bend face.

7. The combination as set forth in claim 1 wherein said collar includes a pair of openings formed therethrough, the upper one of said openings having a width sufficient to pass through it individual links of said second chain, the lower opening of said collar being of a substantially restricted width but sufficient to hold therein a vertically oriented link of said first chain.

8. The combination as set forth in claim 1 in which said first chain is of a length greater than the distance between said pair of chain holders to permit adjustment of the length of said first chain connected between said pair of chain holders to allow lateral adjustment of the hook.

9. A tie down system for a carrier vehicle having a track thereon for supporting a carried vehicle, said carried vehicle having a plurality of openings formed in its frame to permit attachment of locking hooks, wherein the system comprises:
   a first chain attached proximate its ends in said track;
   a collar freely movable link by link along the length of said first chain; and
   a second chain likewise movable link by link through said collar, said second chain having its one end fixed to said track and its other end connected to a hook, said hook engageable with an opposed frame opening.

10. The combination as set forth in claim 9 wherein said first chain is attached to said track intermediate a pair of chain holders, each of said chain holders including at least one flat portion attached to said track and a raised portion including a slot for holding a link of said first chain, and an enlarged opening formed at one end of the slot for permitting passage therein of a link of said first chain.

11. The combination as set forth in claim 9 wherein said first chain has one end connected to a chain holder, said chain holder having a slotted portion for receiving and holding a link of said first chain therein, said first chain further coupled at its other end to said track in a pivotal manner and movable between engagement with a first chain holder and a second chain holder of like construction to said first chain holder to permit swingover of said first chain and changeover of the orientation of said second chain and its associated hook relative to the carried vehicle.

12. The combination as set forth in claim 9 in which said collar includes an upper passage formed therethrough for retaining individual links of said second chain and a lower hook portion engageable through individual links of said first chain.

13. The combination as set forth in claim 10 wherein said collar comprises an upper relatively large diameter opening and a lower elongated slot in communication therewith, said upper opening operable to hold in place a link of said second chain and said lower slot operable to hold in place a link of said first chain.

14. The combination as set forth in claim 9 wherein said first chain is fixed in said track between a pair of fastening means, said fastening means of a lesser spacing than the length of said first chain and wherein said first chain is threaded through at least one slotted pipe, said pipe fixed to said track intermediate said fastening means for passing the links of said first chain therethrough to provide lateral and height adjustment of said hook.

15. In a tie down system for a carrier having a track for supporting a carried vehicle, said vehicle including attachment openings formed in its frame, a first chain horizontally attached to said track, a collar movable link by link along the links of said first chain and a second chain having one end connected to the track of the carrier, extending through said collar and having connected to its free end a hook engageable with one of the opposed attachment openings in the frame, wherein the improvement comprises:

a chain holder for said first chain, said chain holder including at least one flat portion attached to said track and a raised portion including a slot for holding a link of said first chain, said chain holder further having an enlarged opening formed at one end of the slot for permitting pass through of individual links of said first chain in said holder.

* * * * *